(12) United States Patent
Varnau

(10) Patent No.: US 6,497,419 B2
(45) Date of Patent: *Dec. 24, 2002

(54) EXPANDING PULLBACK CLAMPING MODULE

(75) Inventor: Bernard T. Varnau, Cincinnati, OH (US)

(73) Assignee: American Workholding, Inc., Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,550

(22) Filed: Oct. 22, 1999

(65) Prior Publication Data

US 2002/0149160 A1 Oct. 17, 2002

(51) Int. Cl.[7] ........................ B23B 31/103; B23B 31/40
(52) U.S. Cl. ...................... 279/141; 279/137; 279/2.04; 279/4.08
(58) Field of Search ................................ 279/141, 137, 279/2.04, 4.08

(56) References Cited

U.S. PATENT DOCUMENTS

| | | | | |
|---|---|---|---|---|
| 1,539,282 A | * | 5/1925 | Spurr | 279/137 |
| 1,915,005 A | * | 6/1933 | Schmidt | 279/141 |
| 2,387,511 A | * | 10/1945 | Henry et al. | 279/2.04 |
| 2,471,921 A | * | 5/1949 | Ashdown | 279/137 |
| 2,473,380 A | * | 6/1949 | Ljunggren et al. | 279/141 |
| 2,882,061 A | * | 4/1959 | Johnson | 279/141 |
| 2,922,657 A | * | 1/1960 | Garrison et al. | 279/141 |
| 3,615,100 A | * | 10/1971 | Banner | 279/4.08 |
| 3,767,219 A | * | 10/1973 | Fischer et al. | 279/141 |
| 4,125,043 A | * | 11/1978 | Leutgab | 279/141 |
| 5,253,880 A | * | 10/1993 | Won | 279/141 |
| 5,397,135 A | * | 3/1995 | Smith | 279/2.04 |
| 5,429,376 A | * | 7/1995 | Mueller et al. | 279/137 |

FOREIGN PATENT DOCUMENTS

| | | | | | |
|---|---|---|---|---|---|
| DE | 3233868 A | * | 3/1984 | | 279/137 |
| JP | 60-155305 | * | 8/1985 | | 279/137 |
| SU | 1053-978 | * | 11/1983 | | 279/141 |
| SU | 1253-743 | * | 8/1986 | | 279/141 |

* cited by examiner

Primary Examiner—A. L. Wellington
Assistant Examiner—Erica Ergenbright
(74) Attorney, Agent, or Firm—Frost Brown Todd LLC

(57) ABSTRACT

A clamping module has a retractable drawbar and pivoting expansion members. The expansion members are pivotable from a first position having an effective diameter which is less than the minimum diameter of the workpiece hole through which the drawbar and expansion members are extended and a second position engaging the workpiece so as to transmit an axial force from the drawbar through the expansion members to the workpiece sufficient to secure the workpiece.

16 Claims, 6 Drawing Sheets

EXPANDING PULLBACK CLAMPING MODULE

TECHNICAL FIELD

The present invention relates generally to clamping components for holding workpieces in place, and is particularly directed to clamping components for holding workpieces having through-holes. The invention will be specifically disclosed in connection with a hydraulically actuated clamping module which extends through a through-hole.

BACKGROUND OF THE INVENTION

In order to machine parts to finished dimensions, the parts must be accurately and securely held in place. This typically involves clamping the part on the machine tool. Since parts come in all sizes and shapes, securing the parts frequently presents a unique challenge for each part.

To produce a part efficiently, the cutting tool needs as much unobstructed access as possible in order to remove material from the part. Although it is common in industry to secure these parts on fixtures using standard modular clamping components, such components sometimes obstruct or reduce direct access to the areas on the part that have to be machined. Often, multiple clamping components are used, adding to complexity and reducing efficiency.

Additionally, in order to keep the time required to machine parts at a minimum, clamping components must make it easy and quick to unclamp a machined part and clamp the next part. The set up time required to switch from part to part also needs to be at a minimum. To some extent, the use of modular clamping components which are mounted to or in a fixture body has reduced the time required for set up. However, clamping components to date have not completely and adequately addressed all of the problems with unobstructed access to the areas to be machined, the time required to load and unload parts and for set up.

The present invention addresses these problems by eliminating and replacing the use of multiple individual modular clamping components on fixtures for parts with through-holes. The present invention, a modular expanding pullback clamp, provides greater access for cutting tools to engage the part, while also making the loading and unloading of parts by the machine operator straight forward and relatively easy. Parts with through-holes (whether entirely through the part, or just into a cavity large enough to permit use of the present invention) can be easily positioned, clamped and secured on a fixture by the expanding pullback mechanism of the modular hydraulic clamp.

SUMMARY OF THE INVENTION

It is an object of this invention to obviate the above-described problems and shortcomings of the prior art heretofore available.

It is another object of the present invention to provide a clamping module which provides maximum unobstructed access to a workpiece while securely holding the workpiece.

It is yet another object of the present invention to provide a clamping module which can easily accommodate various configurations of workpieces.

It is another object of the present invention to provide a clamping module on which it is easy to load and unload parts.

It is still a further object of the present invention to provide a clamping module which can radially and axially hold a workpiece.

It is yet a further object of the present invention to provide a clamping module in which pressurizing a single hydraulic chamber effects radially and axially clamping of a workpiece.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided a clamping module having a retractable drawbar and pivoting expansion members. The expansion members are pivotable from a first position having an effective diameter which is less than the minimum diameter of the workpiece hole through which the drawbar and expansion members are extended and a second position engaging the workpiece so as to transmit an axial force from the drawbar through the expansion members to the workpiece sufficient to secure the workpiece.

In accordance with another aspect of the present invention, the clamping module includes an expandable collet which, when expanded, applies a radial outward force to the workpiece so as to secure it radially.

In another aspect of the present invention, the drawbar, expansion members and expandable collet are actuated by supplying hydraulic pressure to a single chamber within the body of the clamping module. In accordance with another aspect of the present invention, the pivotable expansion members are engaged at one end by a frustoconical cylinder which resiliently urged there against so as to urge the pivotable expansion members radially inwardly.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF A PREFERRED EMBODIMENT

Figure 1:
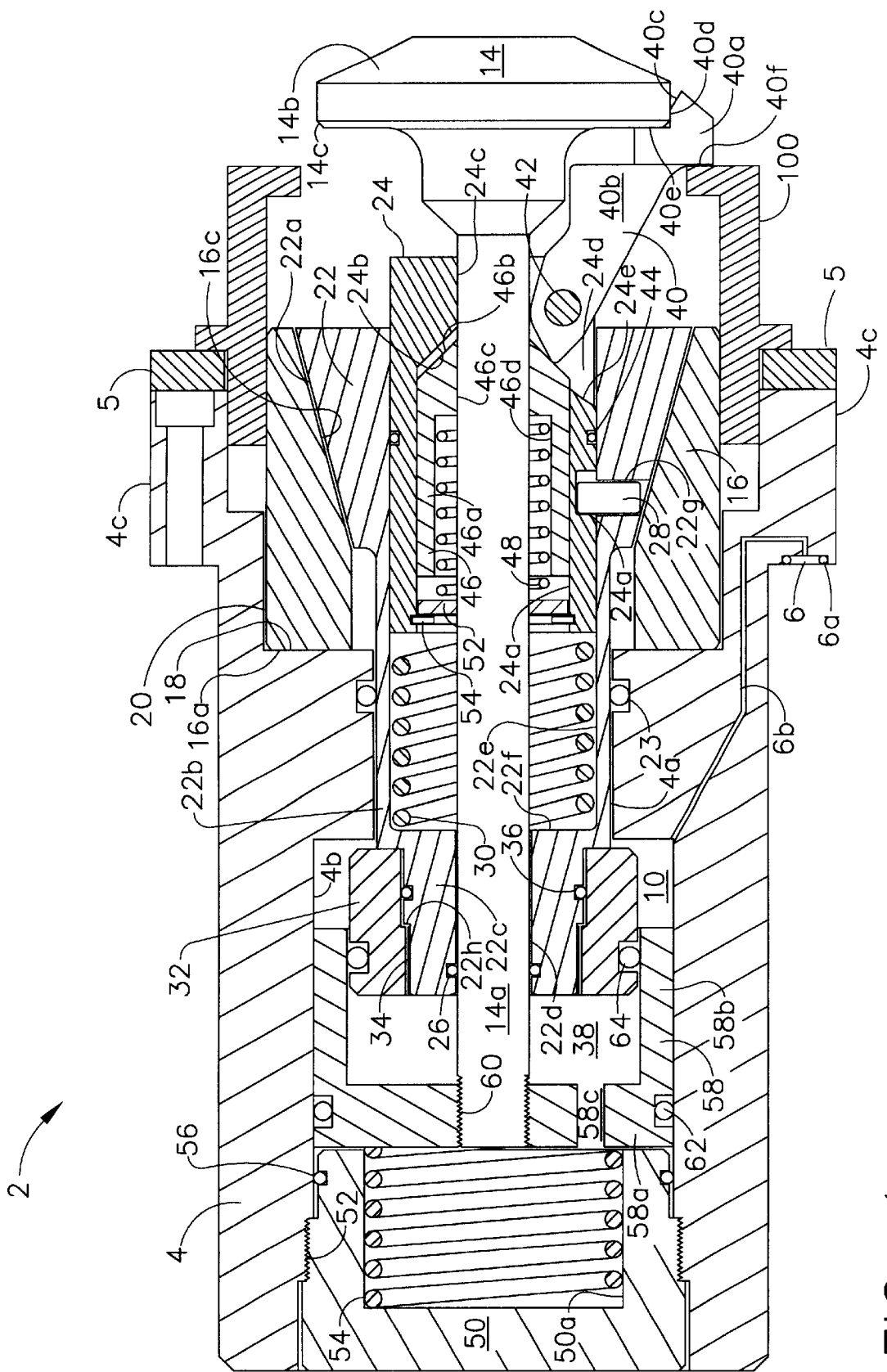
FIG. 1 is a side cross-sectional view of an expanding pullback clamping module constructed in accordance with the present invention, shown with a part secured in place.

Referring now to the drawings in detail, wherein like numerals indicate the same elements throughout the views, FIG. 1 is side cross-sectional view of an expanding pullback clamping module 2 constructed in accordance with the present invention, shown with a part secured in place. Clamping module 2 includes cylindrical body 4 which carries the various components of the clamping mechanism. Body 4 includes mounting pads 4c to secure body 4 in a fixture body (not shown). Position locators 5 may be secured to body 4 to engage complementarily shaped locators on workpiece 100 in order to locate and orient workpiece 100 relative to body 4. (Workpiece may have any shape so long as it has a hole into which clamping module 2 can reach and grab the part. The hole does not have to be completely through the workpiece. For simplification workpiece 100 has been shown only with a through hole and an end, it being recognized that the workpiece may have almost any shape suitable to being held by the present invention.) Position locators 5 may be easily changed in case of wear or damage, and to accommodate different parts, allowing the same clamping module 2 to be used for various parts.

Figure 2:
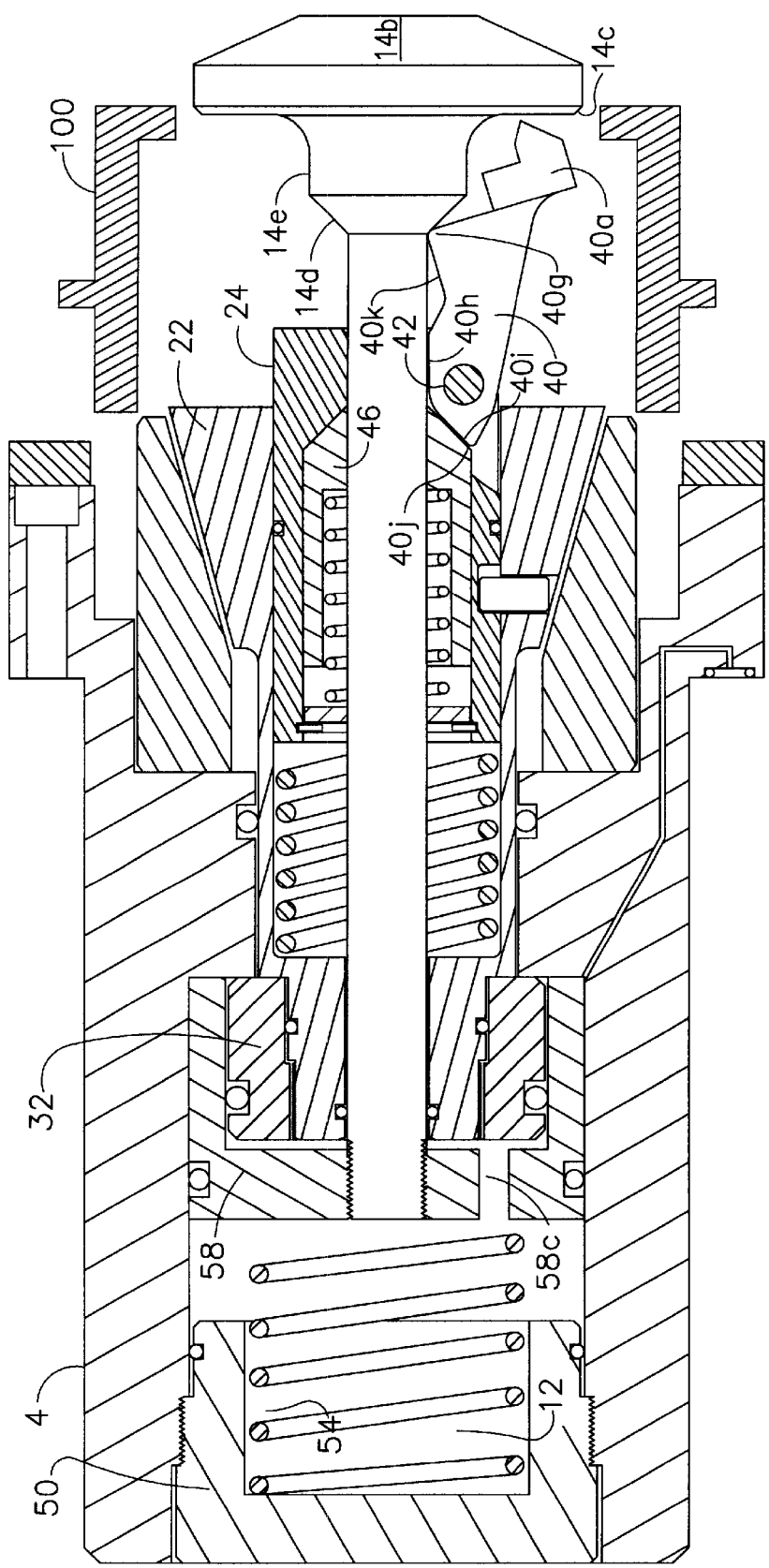
FIG. 2 is a side cross-sectional plan view of the expanding pullback clamping module of FIG. 1, shown with the pullback mechanism extended and with a part being loaded or unloaded.
Figure 3:
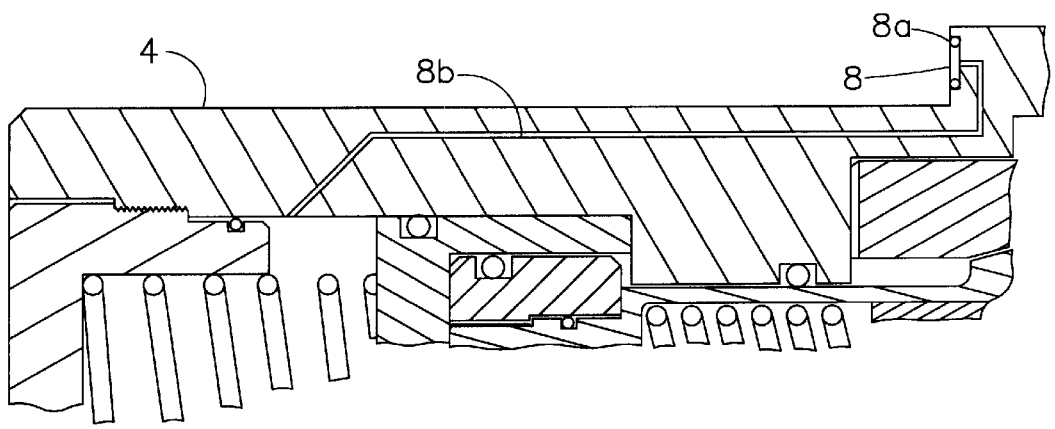
FIG. 3 is a fragmentary, side cross-sectional view of the expanding pullback clamping module showing the hydraulic supply path leading to the unclamping hydraulic chamber.

When the expanding pullback clamping module is used, it is carried by a fixture body (not shown). In the configuration shown, body 4 is cylindrical, shaped complementarily to a bore in the fixture body into which clamping module 2 is disposed. Upon the appropriate selection by the operator, or control system if automatic, pressure is supplied to clamping module 2 to either clamp or unclamp a workpiece. When body 4 is properly disposed in or carried by the fixture body, clamping supply port 6, which is diagrammatically illustrated, is aligned so as to mate with a corresponding source (not shown) of selectively pressurized hydraulic fluid carried by the fixture body. Clamping supply port 6 includes O-ring 6a, and is configured in any way known in the art for making and sealing hydraulic connections. Hydraulic supply path 6b is diagrammatically illustrated as placing supply port 6 in fluid communication with clamping hydraulic chamber 10. Body 4 also includes an unclamping supply port 8 (shown in FIG. 3) including O-ring 8a and is configured any way known in the art for making and sealing hydraulic connections. When body 4 is properly disposed in or carried by the fixture body, unclamping supply port 8 is aligned with a corresponding source (not shown) of selectively pressurized hydraulic fluid carried by the fixture body. Hydraulic supply path 8b places the unclamping supply port in fluid communication with unclamping hydraulic chamber 12 (FIGS. 2 and 3). With this configuration, there are no external hydraulic lines to be disconnected and reconnected between when a clamping module 2 is replaced by another one configured for a different part. The operation of clamping module 2 by pressurizing the clamping supply port or the unclamping supply port will be discussed below.

Body 4 includes a bore extending there through which is comprised of sections of different diameters as shown in FIG. 1. Disposed at least partially within part of the bore through body 4 is drawbar 14, which includes cylindrical portion 14a and head portion 14b. As will be described below, drawbar 14 is movable along its axial centerline, which is aligned with the axial centerline of the bore of body 4.

Figure 5:
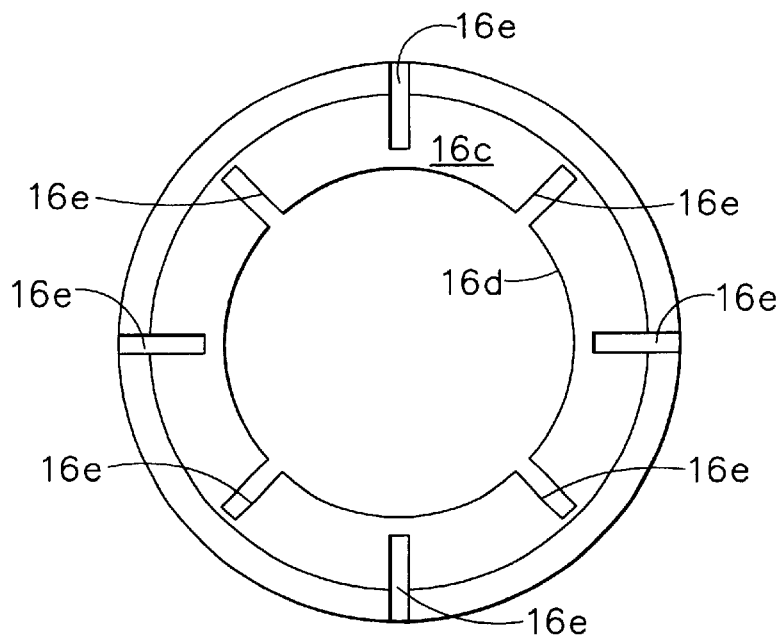
FIG. 5 is a plan view of the expansion collet of the expanding pullback clamping module of FIG. 1.
Figure 6:
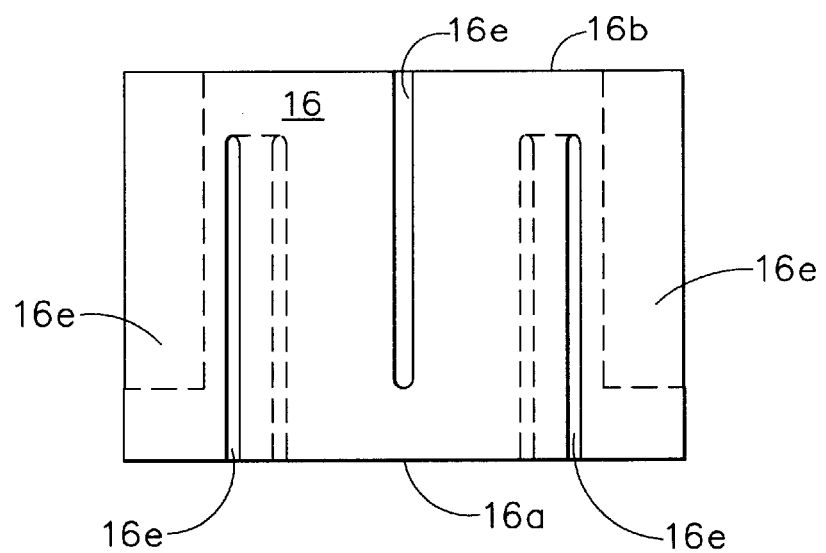
FIG. 6 is a side view of the expansion collet of FIG. 5.

Expansion collet 16 is disposed at least partially within body 4, with first end 16a adjacent step 18. Collet 16 is piloted by bore wall 20 which has a slightly larger inner diameter than the outer diameter of collet 16. Formed through collet 16 is a bore which includes an inclined or conical portion 16c and a constant diameter portion 16d. As shown in FIGS. 5 and 6, collet 16 includes expansion slots 16e formed therein. Half of expansion slots 16e extend from first end 16a toward second end 16b. The other half of expansion slots 16e extend from second end 16b toward first end 16a. Expansion slots 16e are disposed 45° from each other, alternating from which end they start. Expansion slots 16e provide radial resiliency to collet 16 such that the outside diameter of collet 16 can be increased when collet 16 is acted upon by collet drawbar 22 in the manner described below. Other configurations of collet 16 can be used to provide the necessary resilience to expand outwardly when acted upon by collet drawbar 22. For example, the number of slots, orientation (such as spiral or inclined), length or position all could be varied so long as collet 16 had the necessary resilience.

Collet drawbar 22 includes frustoconical portion 22a which is disposed adjacent conical portion 16c. Collet drawbar 22 includes first cylindrical portion 22b extending from frustoconical portion 22b and second cylindrical portion 22c. First cylindrical portion 22b is axially piloted bore 4a of body 4. A seal is formed between bore 4a and first cylindrical portion 22b which prevents hydraulic fluid from flowing out of clamping hydraulic chamber 10. In the embodiment shown, the seal is formed by O-ring 23 disposed as shown in an O-ring grove formed in bore 4a. Any other type of suitable seal may be used, carried by bore 4a or by first cylindrical portion 22b (although the relative thin cross section of cylindrical portion 22b makes it structurally difficult to put an O-ring grove therein).

Collet drawbar 22 has a bore formed therethrough which includes bore 22d that extends along the length of second cylindrical portion 22c and bore 22e which extends along the length of frustoconical portion 22a and first cylindrical portion 22b. The diameter of bore 22d is slightly larger than the outer diameter of cylindrical portion 14a so as to allow piloted axial movement of cylindrical portion 14a through bore 22d. A seal is formed between cylindrical portion 14a and bore 22d which prevents hydraulic fluid from flowing into bore 22e. In the embodiment shown, the seal is formed by O-ring 26 disposed as shown in an O-ring grove formed in bore 22d. Any other type of suitable seal may be used, carried by bore 22d or cylindrical portion 14a.

The diameter of bore 22e is larger than the diameter of bore 22d, resulting in annular step 22f extending therebetween. Bore 22e carries and pilots fulcrum block 24 within collet drawbar 22. Fulcrum block 24 is retained in place by pin 28 which is disposed in hole 22g formed through collet drawbar 22. Pin 28 extends into slot 24a. Slot 24a is longer than the diameter of pin 28 so as to allow limited relative axial motion between collet drawbar 22 and fulcrum block 24. Pin 28 restricts the axial travel of fulcrum block 24 when drawbar 14 is extended so that pivoting expansion members 40 retract, as described below. The motion of fulcrum block 24 is limited by the difference between the length of slot 24a and the diameter of pin 28. In the embodiment depicted, slot 24a is oval in shape with a length of 0.375 inches, and pin 28 is 0.250 inches in diameter, allowing 0.125 inches of axial travel. Spring 30 is disposed within and piloted by bore 22e, and resiliently urges fulcrum block 24 axially outward. In the position shown in FIG. 1, drawbar 14 has been retracted its fullest extent within body 4, thereby pushing fulcrum block 24, through pivoting expansion members 40, toward land 22f, and locating pin 28 near, but not in contact with, the right wall (as shown in FIG. 1) of slot 24a. The stack up dimensions of fulcrum block 24, pivoting expansion members 40, workpiece 100, body 4, expansion collet 16, collet drawbar 22, pin 28 and slot 24a precludes direct contact between pin 28 and the right wall of slot 24a. Direct contact between pin 28 and the right wall of slot 24a is undesirable as it creates a direct mechanical connection between collet drawbar 22 and fulcrum block 24, which could shear pin 28 or limit the amount of axial force that can be exerted on workpiece 100 by linking movement of fulcrum block 24, pivoting expansion members 40 and drawbar 14 directly with movement of collet drawbar 22. Such direct contact would mechanically link the axial expansion of expansion collet 16 with the axial movement of drawbar 14. It is noted that pin 28 also simplifies assembly by holding spring 30 compressed during installation of collet drawbar 22 and the components it carries into body 4.

There is a slip fit between pin 28 and hole 22g which allows pin 28 to be easily installed and removed. Once collet drawbar 22 is located adjacent expansion collet 16, pin 28 cannot back out of hole 22g when the force of spring 30 against pin 28 is relieved due to retraction of drawbar 14 against fulcrum block 24.

Second cylindrical portion 22c is connected to collet piston 32. As shown in the depicted embodiment, second cylindrical portion 22c has two diameters separated by step 22h. The smaller diameter of second cylindrical portion 22c includes external threads which mate at interface 34 with internal threads formed in collet piston 32, securing collet drawbar 22 to collet piston 32. Collet drawbar 22 and collet piston 32 can be connected in any manner, conventional or otherwise, so long as the two are securely fastened together so that the force required to separate collet drawbar 22 from collet piston 32 exceeds the axial force applied to collet drawbar 22 during operation of clamping module 2. For example, second cylindrical portion 22c could be welded, staked, pinned, glued or have an interference fit.

To keep hydraulic fluid from flowing between clamping hydraulic chamber 10 and unclamping hydraulic chamber 38 (see also FIG. 2), a seal is formed between the outer diameter of second cylindrical portion 22c and the inner diameter of collet piston 32. In the embodiment depicted, the seal is accomplished by O-ring 36 carried in a groove formed in the outer diameter of second cylindrical portion 22c. Any other type of suitable seal may be used, whether carried by second cylindrical portion 22c or bore 22d or cylindrical portion 14a.

It is noted that although in the depicted embodiment, the outer diameter of second cylindrical portion 22c is smaller than first cylindrical portion 22b, the diameters may be equal. The smaller diameter of second cylindrical portion 22c simplifies the exact part configuration and assembly. It is also noted that the cross-sectional shape of the described components is not limited to cylindrical, although cylindrical is preferred.

Fulcrum block 24 includes first internal bore 24a, second internal bore 24c and a frustoconical portion 24b therebetween. Second internal bore 24c axially pilots cylindrical portion 14a adjacent head 14b. A seal is formed between bore 22e and fulcrum block 24 to keep cutting fluid and other debris from entering. In the embodiment shown, the seal is formed by O-ring 44 disposed as shown in an O-ring grove formed in the outer surface of fulcrum block 24. Any other type of suitable seal may be used, carried by bore 22e or by fulcrum block 24.

Figure 10:
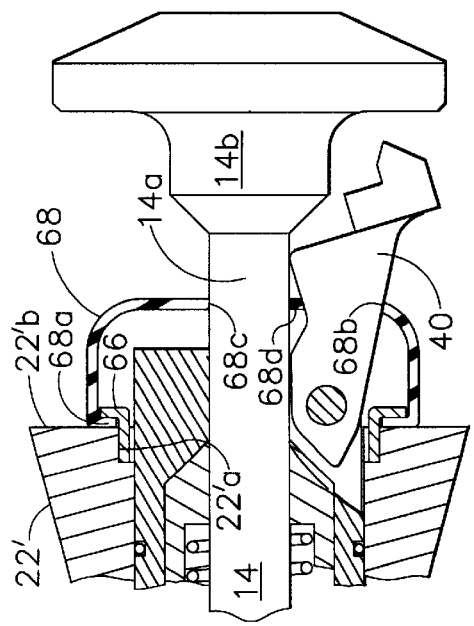
FIG. 10 is an enlarged fragmentary side cross-sectional view showing an embodiment having a flexible boot.

FIG. 10 shows another way to keep cutting fluid and debris from entering clamping module 2. Collet drawbar 22' includes step 22'a which receives collar 66. Boot 68 includes annular lip 68a which fits into the gap between collar 66 and end 22'b of collet drawbar 22'.

Boot 68 includes respective openings 68a through which respective fingers 40 pass, and opening 68c through which cylindrical portion 14a passes. Opening 68c engages cylindrical portion 14a snugly while allowing axial motion therebetween. Openings 68b also engage fingers 40 snugly while allowing relative motion therebetween. Boot 68 includes respective portions 68d located between opening 68c and respective openings 68b. Portions 68d must accommodate outward motion of fingers 40. To accomplish this, portions 68d may be of increased thickness, bellowed, or any other construction which allows such outward movement.

Figure 7:
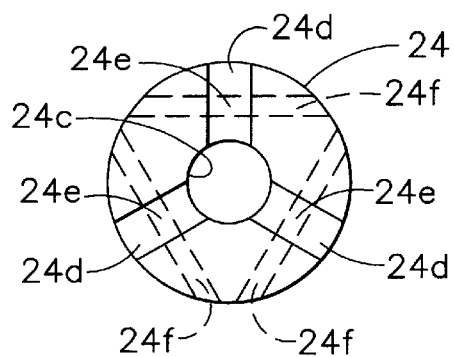
FIG. 7 is end view of the fulcrum block of the expanding pullback clamping module of FIG. 1.

Fulcrum block 24 carries three pivoting expansion members or fingers 40 only one of which is visible in FIG. 1. Finger 40 is pivotably secured to fulcrum block 24 by pin 42 which acts as the pivot point for finger 40. Referring to FIG. 7, there is shown an end view of fulcrum block 24. Fulcrum block 24 includes three slots 24d disposed 120° from each other. As can be seen in FIG. 1, slots 24d have respective slot bottoms 24e which are arcuate due to the circular cutter used to cut slots 24d in fulcrum block 24. The shape of slot bottoms 24e is not critical.

Hidden features of fulcrum block 24 are not shown in FIG. 7 except for holes 24f which intersect respective slots 24d. Holes 24f receive pins 42 to pivotably retain respective fingers 40 in respective slots 24e.

Although in the depicted embodiment, three equally spaced fingers 40 are carried by fulcrum block 24, more or less fingers 40 and different orientations of fingers 40 may be used.

Fulcrum block 24 carries spring plunger 46 disposed within bore 24a. Spring plunger 46 has first cylindrical portion 46a, which is piloted in bore 24a with both being sized to allow relative axial motion therebetween, and frustoconical portion 46b, which is complementarily shaped with frustoconical portion 24b. Spring plunger includes bore 46c, which pilots cylindrical portion 14a, and bore 46d, having a larger diameter than bore 46c and piloting spring 48. One end of spring 48 engages step 46e formed between bore 46c and 46d, while the other end engages washer 52. Washer 52 is retained by internal snap ring 54 carried by spring plunger 46 as shown. Spring 48 resiliently urges spring plunger 46 toward frustoconical portion 24b of fulcrum block 24.

End cap 50 is secured to one end of body 4 as shown in FIG. 1. In the embodiment depicted, end cap 50 includes external threads which mate at interface 52a with corresponding internal threads formed in body 4. End cap may be connected to body 4 in any suitable manner, including a permanent connection if disassembly is not required. End cap 50 includes bore 50a which pilots spring 54a.

Body 4 includes bore 4b. A seal is formed between bore 4b and end cap 50 which prevents hydraulic fluid from flowing out of clamping hydraulic chamber 12 (see FIG. 2). In the embodiment shown, the seal is formed by O-ring 56 disposed as shown in an O-ring grove formed in end cap 50.

Any other type of suitable seal may be used, carried by bore 4b or by end cap 50.

An internal cavity is thus formed by bore 4b and end cap 50 which is sealed by O-rings 23, 26 and 56. Disposed in this internal cavity are collet piston 32 and drawbar piston 58 which separate the cavity into two variable volume hydraulic chambers, clamping hydraulic chamber 10 and unclamping hydraulic chamber 12.

Drawbar piston 58 is connected to the distal end of cylindrical portion 14a by external threads which mate at interface 60 with internal threads formed in drawbar piston 58, securing drawbar 14 to drawbar piston 58. Drawbar 14 can be connected in any manner, conventional or otherwise, so long as the two are securely fastened together. For example, second drawbar piston 58 could be welded, staked, pinned, glued or interference fit, provided that the force required to separate drawbar 14 from drawbar piston 58 exceeded the axial force required to be transmitted to drawbar 14 during operation of clamping module 2.

Drawbar piston 58 is piloted by bore 4b. A seal is formed between bore 4a and drawbar piston 58 which separates clamping hydraulic chamber 10 from unclamping hydraulic chamber 12. In the embodiment shown, the seal is formed by O-ring 62 disposed as shown in an O-ring grove formed in the outer diameter of drawbar piston 58. Any other type of suitable seal may be used, carried by bore 4b or by drawbar piston 58.

Drawbar piston 58 includes end wall 58a from which annular wall 58b extends. Port 58c is formed through end wall 58a, placing hydraulic cavity 38 in fluid communication with unclamping hydraulic cavity 12. Annular wall 58b extends around a portion of collet piston 32. A seal is formed between annular wall 58b and collet piston 32 which separates clamping hydraulic chamber 10 from unclamping hydraulic chamber 12. In the embodiment shown, the seal is formed by O-ring 64 disposed as shown in an O-ring grove formed in collet piston 32. Any other type of suitable seal may be used, carried by collet piston 32 or annular wall 58b. The length of annular wall 58b is sufficient to maintain this seal through all movement of drawbar piston 58 and collet piston 32.

FIGS. 1 & 2, FIG. 1 shows clamping module 2 with drawbar 14 retracted, securing workpiece 100 in place. FIG. 2 shows clamping module 2 with drawbar 14 fully extended and workpiece 100 being loaded or unloaded. FIGS. 1 & 2 illustrate two positions of fingers 40 (it being recognized that fingers 40 occupy any positions therebetween).

Figure 8:
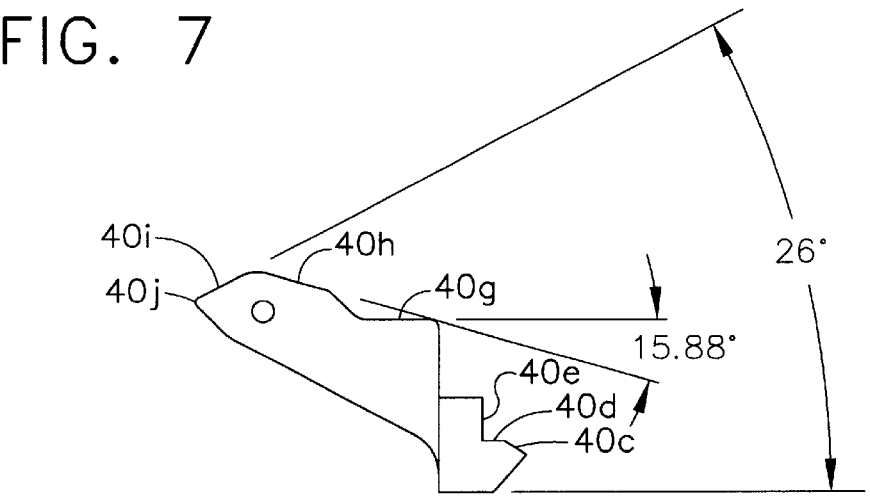
FIG. 8 is a side view of the pivotable expansion member of the expanding pullback clamping module of FIG. 1, showing the relative angular measurements of various portions thereof.
Figure 9:
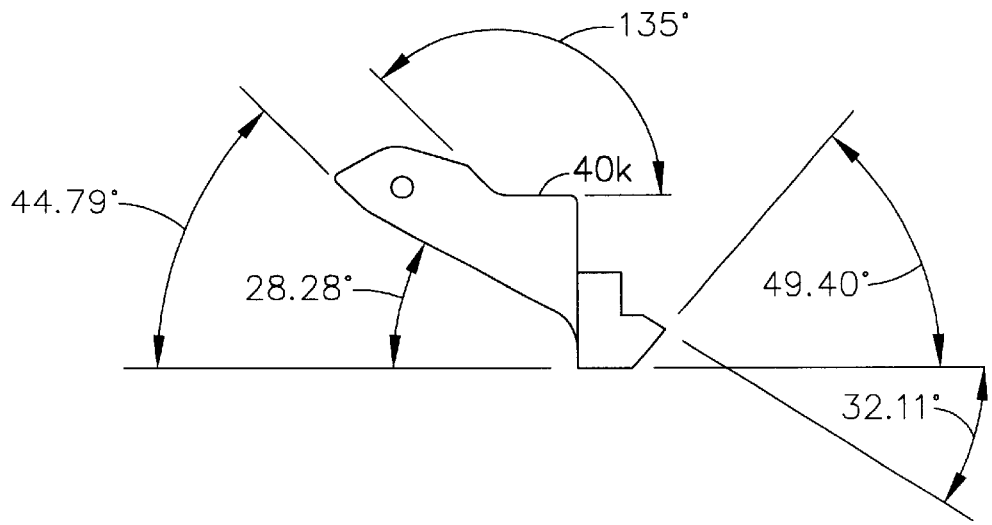
FIG. 9 is a side view of the pivotable expansion member of the expanding pullback clamping module of FIG. 1, showing the relative angular measurements of various portions thereof.

Fingers 40 each include several surfaces which engage drawbar 14 and spring plunger 46 to control the motion of fingers 40 as drawbar 14 is extended and retracted. FIGS. 8 and 9 illustrate the relative angular dimensions of portions of finger 40 which cooperate with the profile of drawbar 14 to produce the desired motion of fingers 40. Finger 40 includes arcuate segment 40a (see FIG. 4) and arm 40b (see FIG. 1) Arcuate segment 40a includes arcuate chamfer 40c, arcuate wall segment 40d and arcuate flat segment 40e. Arcuate wall segment 40d has a radius complementary to the radius of head portion 14b.

In FIG. 2, finger 40 is shown in a first, retracted position. In this position, the effective perimeter of the outermost part of arcuate segment 40a is less than the effective perimeter of head portion 14b and correspondingly the relevant perimeter dimension of workpiece 100. In the embodiment illustrated, this is the first, retracted position, it is the diameter of the outermost part of arcuate segment 40a which is less than the diameter of head portion 14b and correspondingly the relevant diameter of workpiece 100. This allows workpiece 100 to slip past head portion 14b and arcuate segments 40a of fingers 40. Frustoconical portion 46b of spring plunger 46 urges ramp 40i at the end of arm 40 outwardly, causing ramp follower 40g opposite pivot pin 42 to be urged inwardly against drawbar 14. Spring plunger 46 and frustoconical portion 46b are dimensioned such that frustoconical portion 46b does not directly contact frustoconical portion 24b. This maintains force against ramp 40i ensuring that fingers 40 stay retracted against drawbar 14 when drawbar 14 is extended. The angle of ramp 40i may be slightly different than the angle of frustoconical portion 46b to assure that contact therebetween will be as close to tip 40j as possible, thus ensuring finger 40 remains urged against drawbar 14.

Alternatively, fingers 40 may be urged inwardly against drawbar 14 by use of a continuous resilient ring, such as an O-ring or endless spring secured to the outside of arms 40b, such as in a notch (not shown).

As drawbar 14 is retracted, the profile of fingers 40 follow the corresponding profile of drawbar 14 so as to cause the desired motion to expand fingers 40 outwardly. Ramp follower 40g travels up ramp 14d, which has a frustoconical shape. Portion 40h of finger 40 adjacent pin 42 is shaped to clear cylindrical portion 14a as ramp follower 40g travels up ramp 14d. Ramp 40i slides along frustoconical portion 46b until tip 40j of finger 40 is the only contact between frustoconical portion 46b and finger 40, forcing spring plunger 46 axially away from pivot point 42 and compressing spring 48. In the embodiment depicted, spring plunger 46 continuously contacts finger 40 for all positions of finger 40.

Once ramp follower 40g reaches cylindrical portion 14e, flat portion 40k slides axially along cylindrical portion 14e until outer edge 14c of head portion 14b reaches arcuate chamfer 40c. The diameter (or effective perimeter) of outer edge 14c is the control diameter which controls the radial location of fingers 40 by locating arcuate wall segment 40d. Depending on the dimensions, flat portion 40k may remain in contact with cylindrical portion 14e after outer edge 14c reaches arcuate chamfer 40c and proceeds to contact arcuate wall segment 14d directly. However, the contact between flat portion 40k and cylindrical portion 14e may position arcuate wall segment 40d such that arcuate chamfer 40c is contacted by outer edge 14c, in which case fingers 40 will be spread further outward as drawbar 14 continues to retract, so that flat portion 40k ceases to contact cylindrical portion 14e. Once chamfered outer edge 14c reaches the intersection of arcuate chamfer 40c and arcuate wall segment 40d, fingers 40 cease spreading as drawbar 14 is retracted further until bottom 14d engages arcuate flat segment 40e. Further retraction of drawbar 14 brings arcuate flat segment 40f into contact with workpiece 100 as shown in FIG. 1 creating axial clamping force directly between head portion 14b, through arcuate segment 40a to workpiece 100.

Figure 4:
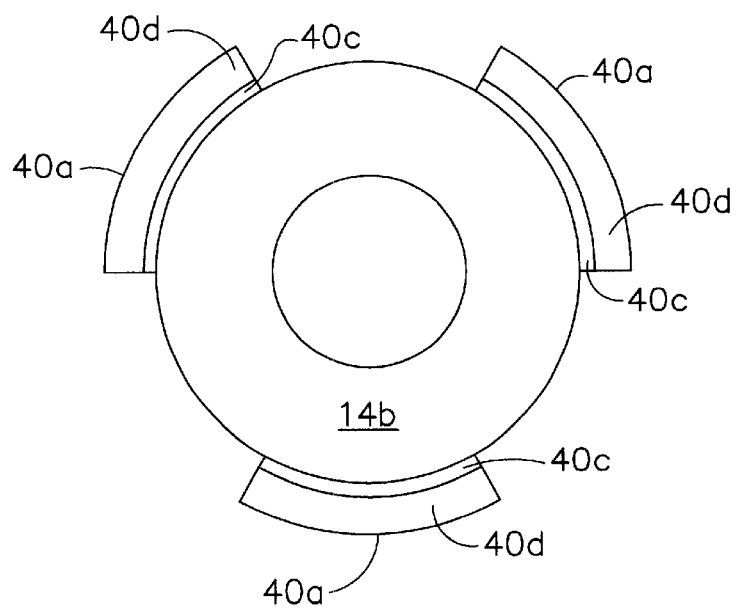
FIG. 4 is an end view of the drawbar of the pullback clamping module of FIG. 1, showing the pivoting expansion members fully extended in position to secure a part.

FIG. 4 is an end view of drawbar 14 in the retracted position, showing the pivoting expansion members fully extended in position to secure a workpiece 100 (not shown in FIG. 4). Arcuate segment 40a is centered over arm 40b (not shown in FIG. 4), which depends downwardly therefrom, as is seen in the side cross-sectional figures. The angle subtended by arcuate segment 40a is selected such that the arcuate segments 40a will not interfere with each other when fingers 40 are in the fully retracted position. In the embodiment depicted, the included angle of arcuate segments 40a is 44.46°.

In operation, workpiece 100 is slid past head portion 14b and fingers 40 and located, in conjunction with locator pads 5, adjacent body 4 and expansion collet 16. Pressurized hydraulic fluid is supplied to clamping hydraulic chamber 10, causing drawbar piston 58 and collet piston 32 to move toward end cap 50. As collet piston 32 advances, collet drawbar 22 engages expansion collet 16, expanding it outwardly to engage the inner surface of workpiece 100, thereby radially locating and securing workpiece 100. Collet piston 32 advances until the force exerted thereon by the hydraulic pressure equals the axial force generated by expansion of expansion collet 16.

The movement of drawbar piston 58 retracts drawbar 14 into clamping module 2, compressing spring 48 and causing fingers 40 to expand, eventually engaging the distal end of workpiece 100 and applying an axial clamping force thereto. Since drawbar 22 contacts expansion collet 16 before fingers 40 contact workpiece 100, there is relative motion between collet piston 24 and drawbar piston 58. This relative motion results in a change in the volume of unclamping hydraulic chamber 38, which is not pressurized when drawbar 14 is being retracted. Port 58c allows hydraulic fluid to flow between unclamping hydraulic chamber 38 and unclamping hydraulic chamber 12.

To unload workpiece 100, pressurized hydraulic fluid is supplied to unclamping hydraulic chamber 12, causing drawbar piston 58 and collet piston 32 to move away from end cap 50. Spring 54a assists in returning drawbar piston 58. As drawbar piston 58 extends drawbar 14, fingers 40 retract as described above. Eventually drawbar piston 58 and collet piston 32 reach the full extent of their travel and stop. At that point, expansion collet 16 will have ceased applying radial force on workpiece 100 and drawbar 13 will have ceased applying axial force on workpiece 100.

Figure 11:
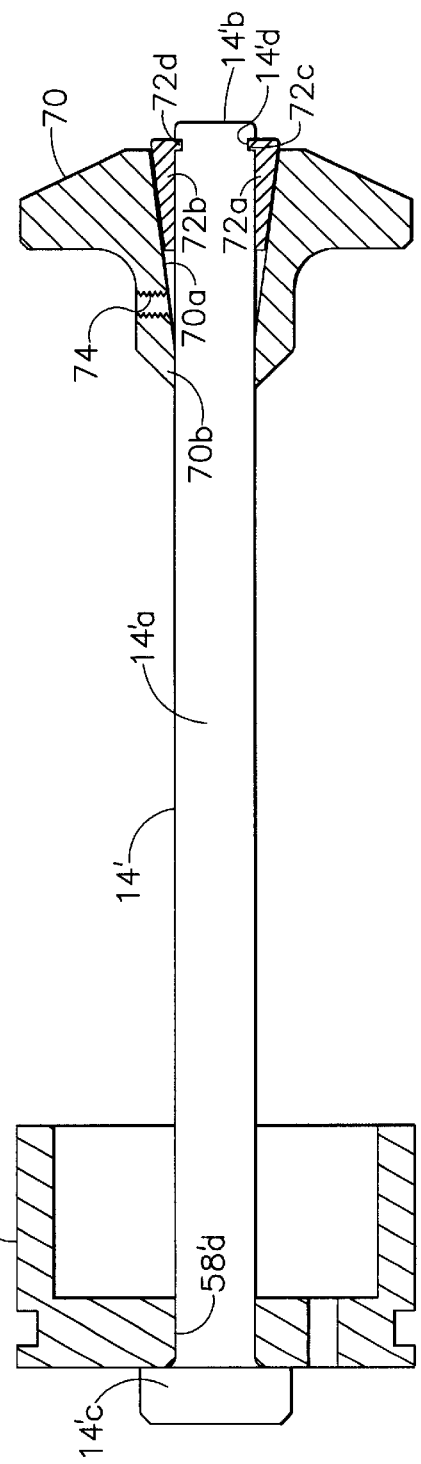
FIG. 11 is a side cross-sectional view of an alternate embodiment of the drawbar piston and drawbar.

FIG. 11 is a side cross-sectional view of an alternate embodiment of the drawbar piston and drawbar. Drawbar 14' includes cylindrical portion 14'a having an expanded head 14'c. Cylindrical portion 14'a is disposed through bore 58'd of drawbar piston 58'. Head 14'c has a larger cross-sectional area than bore 58'd, preventing cylindrical portion 14'a from passing therethrough. A slight press fit between cylindrical portion 14'a and bore 58'd holds cylindrical portion 14'a securely. Other way known ways in the art may be used to secure cylindrical portion 14'a to drawbar piston 58' so that it cannot be pulled through bore 58'd. A seal is not necessary between cylindrical portion 14' and drawbar piston 58'.

Cylindrical portion 14' includes annular groove 14'd adjacent end 14'b. Head 70 is separate from drawbar 14', having a shape similar to head portion 14b, described above, except that frustoconical bore 70a and cylindrical bore 70b are formed therethough. Cylindrical bore 70b is sized to slip over end 14'b so that split cone retainers 72a and 72b may be disposed adjacent end 14'b with ribs 72c and 72d being located in annular groove 14'd. Although split cone retainers 72a and 72b have the advantage that the radial force holding ribs 72c and 72d in annular groove 14'd increases with as axial force on head 70 increases, any other suitable retainer construction may be used.

To assemble, head 70 is then located surrounding and engaging split cone retainers 72a and 72b. Set screw 74 secures head 70 from sliding down cylindrical portion 14'a. A flat (not shown) may be formed in cylindrical portion 14'a for set screw 74 to rest upon.

This alternate embodiment shown in FIG. 11 allows drawbar 14' to be pre-assembled to drawbar piston 58' and installed into body 4 from the opposite end. It also allows higher force to be exerted on and by drawbar 14' since expanded head 14'c physically prevents drawbar 14' from slipping through drawbar piston 58' as could happen with threads at interface 60 with high pressures in clamping hydraulic chamber 10. It also allows changing head 70 without having to disassemble the entire clamping module.

Typical operating hydraulic pressures for the clamping module are in the range of 2200 psig, generating about 2000 pounds force in the drawbar for clamping, and about 800–900 pounds force in the collet drawbar for expanding the expansion collet. The alternate embodiment of FIG. 11 will accommodate higher operating pressures.

Numerous variations are possible without departing from the teachings of this invention. It is noted that expansion collet 16 may be omitted for parts that do not require radial clamping to be adequately secured for machining. In such case, clamping module 2 would include the components as required for the operation of the expanding fingers and the drawbar. Drawbar head portion 14b does not have to be full diameter, instead it may simply match the locations of the fingers (as long as the drawbar is indexed somehow to the finger locations). The pistons may be operated through any suitable fluid, whether or not liquid. The movement of the drawbar and/or collet drawbar may be controlled electromagnetically. The workpiece opening edge which the fingers engage may even be irregularly shaped so long as the workpiece can be located and held side to side and axially. Different locator plates may be used with a single clamping module design to accommodate various workpiece configurations. Clamping modules designed for different parts may easily be removed and installed into the fixture body, without a need to handle hydraulic connections.

In summary, numerous benefits have been described which result form employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A clamp for holding a workpiece in place, said workpiece having an opening, said opening having an effective perimeter, said clamp comprising:

a. a first member movable along an axis from a first position to a second position, said first member having an effective perimeter which is less than the effective perimeter of said opening of said workpiece; and b. a plurality of pivoting expansion members being in a retracted position when said first member is in said first position, and being in an extended position when said first member is in said second position, said plurality of expansion members contacting said first member when said first member is in said second position such that substantially all force transmitted by said first member to said plurality of expansion members is axial, said plurality of expansion members having a retracted effective perimeter when said plurality of expansion members are disposed at said retracted position, said retracted effective perimeter being less than the effective perimeter of said opening of said workpiece, said plurality of pivoting expansion members being configured to engage said workpiece when said plurality of expansion members are disposed at said extended position.

2. The clamp of claim 1, wherein said plurality of pivoting expansion members is resiliently urged toward said retracted position.

3. The clamp of claim 2, comprising a second member moveable along said axis, said plurality of pivoting expansion members being resiliently urged toward said retracted position by said second member.

4. The clamp of claim 1, comprising a second member configured to engage said workpiece and to locate said workpiece radially with respect to said axis.

5. The clamp of claim 4, wherein said second member is radially resilient.

6. The clamp of claim 1, wherein said second member is configured to locate said workpiece radially as said first member moves from said first position to said second position, prior to said first member reaching said second position.

7. The clamp of claim 1, wherein said first member comprises a shaft extending coaxially with said axis and further comprising a second member, said second member including a first bore, said shaft being disposed in said first bore and slidably moveable with respect to said second member, said second member carrying said plurality of pivoting expansion members.

8. The clamp of claim 7, wherein said second member includes a second bore, said second bore being aligned and continuous with said first bore, and further comprising a third member moveable along said axis, said third member being slidably carried by said second bore, said plurality of pivoting expansion members being resiliently urged toward said retracted position by said third member.

9. The clamp of claim 8, wherein said third member is axially based toward said plurality of pivoting expansion members.

10. The claim of claim 7, wherein said second member includes a perimeter, further comprising a third member having a bore shaped complementary to the perimeter of said second member, said second member being slidably disposed at least partially in said bore of said third member, and a fourth configured to engage said workpiece and to locate said workpiece radially with respect to said axis in response to axial movement of said third member.

11. The clamp of claim 10, wherein axial movement of said third member causes said fourth member to radially expand.

12. The clamp of claim 11, wherein said third and fourth members include respective, complementarily shaped conical surfaces which engage each other as said third member moves in a first direction, said fourth member being restrained from axial movement in said first direction beyond a predetermined position.

13. The clamp of claim 12, further comprising a piston connected to said third member, said piston being disposed in a first chamber, said piston moving in said first direction as a result of pressure in said first chamber.

14. The clamp of claim 10, further comprising a first piston connected to said first member, said piston having a first side and a second side, said piston moving said first member toward and to said second position when pressure is applied to said second side.

15. The clamp of claim 14, wherein said first piston includes a first bore, and further comprising a second piston connected to said third member, said second member being at least partially diposed and axially moveably within said first bore of said first piston.

16. The clamp of claim 1, further comprising a piston connected to said first member, said piston having a first side and a second side, said piston moving said first member toward and to said second position when pressure is applied to said second side.

* * * * *